US008352562B2

(12) United States Patent
Winkler

(10) Patent No.: US 8,352,562 B2
(45) Date of Patent: Jan. 8, 2013

(54) EVENT NOTIFICATIONS OF PROGRAM LANDSCAPE ALTERATIONS

(75) Inventor: Steven T. Winkler, Walnut Creek, CA (US)

(73) Assignee: SAP AG, Walldorf (DE)

( * ) Notice: Subject to any disclaimer, the term of this patent is extended or adjusted under 35 U.S.C. 154(b) by 808 days.

(21) Appl. No.: 12/511,511

(22) Filed: Jul. 29, 2009

(65) Prior Publication Data

US 2011/0029614 A1 Feb. 3, 2011

(51) Int. Cl.
G06F 15/16 (2006.01)
(52) U.S. Cl. .................................................... 709/206
(58) Field of Classification Search .................. 709/206
See application file for complete search history.

(56) References Cited

U.S. PATENT DOCUMENTS

| | | | |
|---|---|---|---|
| 6,338,149 B1* | 1/2002 | Ciccone et al. | 714/38.12 |
| 6,829,639 B1* | 12/2004 | Lawson et al. | 709/224 |
| 8,146,103 B2* | 3/2012 | Schmidt et al. | 719/318 |
| 2002/0026505 A1* | 2/2002 | Terry | 709/221 |
| 2002/0026605 A1* | 2/2002 | Terry | 714/37 |
| 2003/0126240 A1* | 7/2003 | Vosseler | 709/221 |
| 2003/0217124 A1* | 11/2003 | Parry | 709/220 |
| 2004/0068667 A1* | 4/2004 | Kumhyr et al. | 713/201 |
| 2004/0098472 A1* | 5/2004 | Styles et al. | 709/221 |
| 2006/0004737 A1* | 1/2006 | Grzonka | 707/4 |
| 2006/0031830 A1* | 2/2006 | Chu et al. | 717/174 |
| 2007/0124255 A1* | 5/2007 | DiFalco et al. | 705/80 |
| 2008/0034363 A1* | 2/2008 | Jones | 717/174 |
| 2008/0244704 A1* | 10/2008 | Lotter et al. | 726/3 |
| 2009/0070784 A1* | 3/2009 | Schmidt et al. | 719/318 |
| 2010/0100778 A1* | 4/2010 | Sullivan | 714/57 |
| 2011/0047621 A1* | 2/2011 | Brando et al. | 726/24 |

OTHER PUBLICATIONS

'Is Facebook the new MySpace?' [online]. PC World, 2007, [retrieved on Jul. 22, 2009]. Retrieved from the Internet: <URL: www.accessmylibrary.com/comsite5/bin/aml_landing_tt.pl?purchase_type=ITM&ite>, 1 page.
'Designers Guide to Facebook Newsfeed, Invitations, Notifications and Emails' [online]. AF Design, 2008, [retrieved on Jul. 22, 2009]. Retrieved from the Internet: <URL: http://af-design.com/blog/2008/10/16/designers-guide-to-facebook-newsfeed-invitations-notifications-and-emails/>, 5 pages.

* cited by examiner

Primary Examiner — Imad Hussain
(74) Attorney, Agent, or Firm — Fish & Richardson P.C.

(57) ABSTRACT

A first computer system is monitored for alterations of a program landscape which includes multiple applications configured to operate on the first computer system. An alteration of the program landscape is detected and aspects of the alteration of the program landscape are determined. A catalog of additional computer systems which are associated with the first computer system is accessed. That a second computer system of the accessed catalog of additional computer systems should receive an event notification is determined. An event notification including information corresponding to the determined aspects of the alteration of the program landscape is generated. The event notification including the event information is sent from the first computer system to the second computer system.

19 Claims, 5 Drawing Sheets

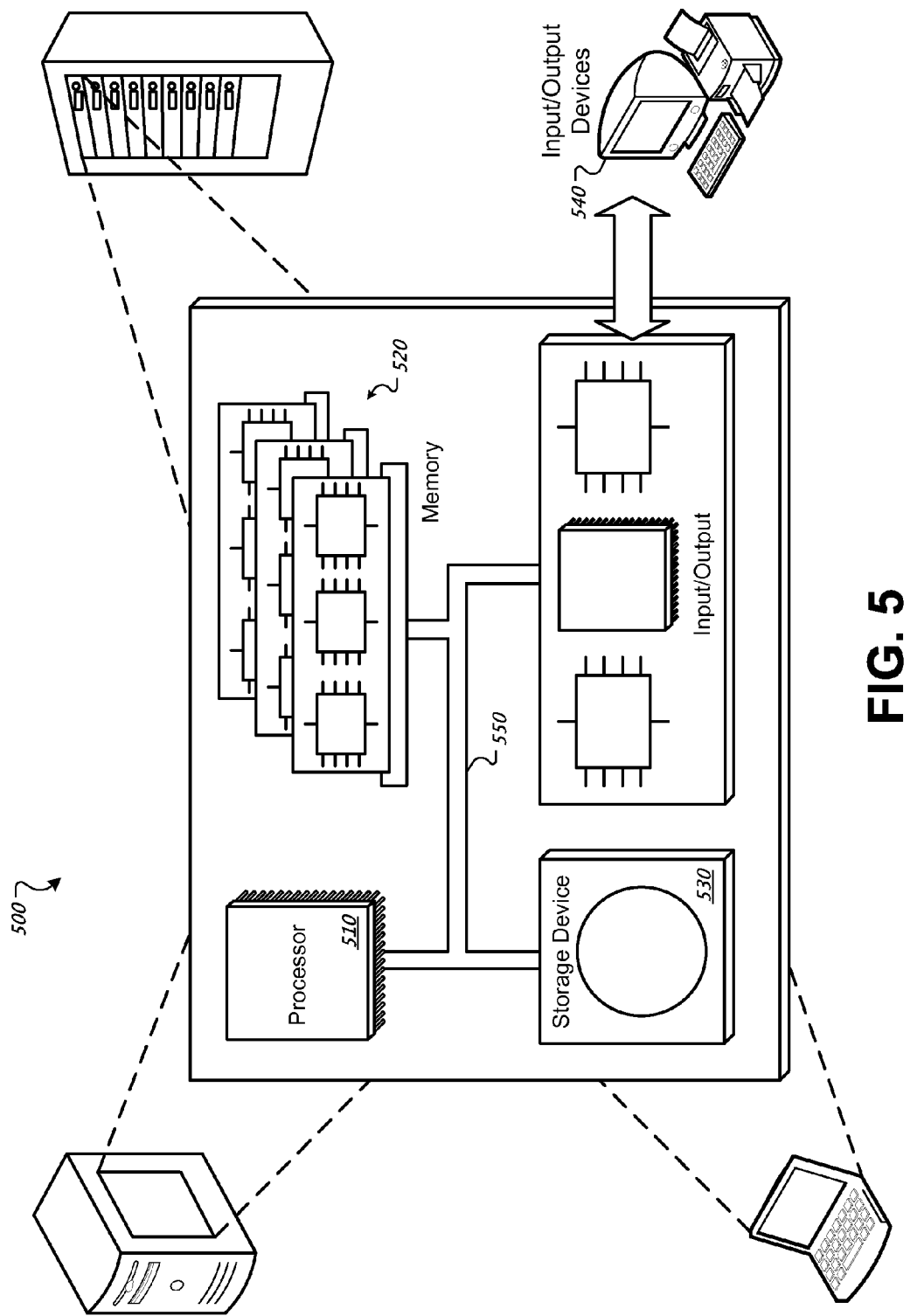

EVENT NOTIFICATIONS OF PROGRAM LANDSCAPE ALTERATIONS

TECHNICAL FIELD

This document relates to generation of event notifications based on occurrence of one or more program landscape alterations.

BACKGROUND

Large-scale businesses may use a computer system with many individual computer terminals in carrying-out day to day operations. In order to efficiently manage the computer system, a business may install applications on one or more computers, such as, for example, an enterprise application on a centralized server. The enterprise application can be designed to coordinate activity and information flow across the computer system.

SUMMARY

According to one general aspect, a computer-implemented method includes monitoring a first computer system for alterations of a program landscape, the program landscape including multiple applications configured to operate on the first computer system. The method also includes detecting an alteration of the program landscape and determining aspects of the alteration of the program landscape. The method further includes accessing a catalog of additional computer systems which are associated with the first computer system. In addition, the method includes determining that a second computer system of the accessed catalog of additional computer systems should receive an event notification. Moreover, the method includes generating an event notification including information corresponding to the determined aspects of the alteration of the program landscape. Finally, the method includes sending the event notification including the event information from the first computer system to the second computer system.

This and other implementations can optionally include one or more of the following features, which also may optionally be in any combination. For example, monitoring the first computer system for alterations of the program landscape can includes at least one of monitoring the first computer system for installation of a new application or monitoring the first computer system for a change to an version of an existing application. Monitoring the first computer system for installation of a new application can include monitoring a registry of an operating system for the addition of a new entry. Determining aspects of the alteration of the program landscape can include determining a name of an application. Generating the event notification including information corresponding to the determined aspects of the alteration of the program landscape can include generating the event notification as including the determined name of the application and sending the event notification including the event information from the first computer system to the second computer system includes sending the event notification including the determined name of the application.

Also, determining aspects of the alteration of the program landscape can include determining a time of the alteration of the program landscape. Generating the event notification including information corresponding to the determined aspects of the alteration of the program landscape can includes generating the event notification as including the determined time of the alteration of the program landscape. Sending the event notification including the event information from the first computer system to the second computer system can include sending the event notification including the determined time of the alteration of the program landscape. Determining aspects of the alteration of the program landscape can include determining a type of activity related to the alteration of the program landscape. Generating the event notification including information corresponding to the determined aspects of the alteration of the program landscape can include generating the event notification as including the type of activity related to the alteration of the program landscape. Sending the event notification including the event information from the first computer system to the second computer system can include sending the event notification including the type of activity related to the alteration of the program landscape.

Further, determining aspects of the alteration of the program landscape can include determining a physical location related to the alteration of the program landscape. Generating the event notification including information corresponding to the determined aspects of the alteration of the program landscape can include generating the event notification as including the physical location related to the alteration of the program landscape. Sending the event notification including the event information from the first computer system to the second computer system can include sending the event notification including the physical location related to the alteration of the program landscape. Determining aspects of the alteration of the program landscape can include determining an identity of an operator involved in the alteration of the program landscape. Generating the event notification including information corresponding to the determined aspects of the alteration of the program landscape can include generating the event notification as including the identity of the operator involved in the alteration of the program landscape. Sending the event notification including the event information from the first computer system to the second computer system can include sending the event notification including the identity of the operator involved in the alteration of the program landscape.

Moreover, the method can include accessing notification criteria, wherein determining the second computer system of the accessed catalog of additional computer systems should receive the event notification includes determining that the second computer system of the accessed catalog of additional computer systems meets criteria of the accessed notification criteria. Determining that the second computer system of the accessed catalog of additional computer systems meets criteria of the accessed notification criteria can include determining that the alteration of the program landscapes relates to type of business or activity of which the second computer system is also related. The computer-implemented method can be performed entirely at the first computer system.

In addition, the method can include sending information corresponding to the determined aspects of the alteration of the program landscape from the first computer system to a server. The server can perform the accessing of the catalog of additional computer systems which are associated with the first computer system. The server can perform the determining that the second computer system of the accessed catalog of additional computer systems should receive an event notification. The server can perform the generating of the event notification including information corresponding to the determined aspects of the alteration of the program landscape. The server can perform the sending of the event notification including the event information from the first computer system to the second computer system.

Furthermore, the method can include determining, at the server, additional information to be included in the event notification. Generating the event notification can include generating the event notification as including information corresponding to the determined aspects of the alteration of the program landscape received from the first computer system and the additional information determined at the server. Sending the event notification to the second computer system can include sending the event notification including information corresponding to the determined aspects of the alteration and the additional information to the second computer.

According to another general aspect, a computer program product tangibly embodied in a computer-readable storage medium and comprising instructions that when executed by a processor perform a method including monitoring a first computer system for alterations of a program landscape, the program landscape including multiple applications configured to operate on the first computer system. The method also include detecting an alteration of the program landscape and determining aspects of the alteration of the program landscape. The method further includes accessing a catalog of additional computer systems which are associated with the first computer system. Moreover, the method includes determining that a second computer system of the accessed catalog of additional computer systems should receive an event notification. In addition, the method includes generating an event notification including information corresponding to the determined aspects of the alteration of the program landscape. Finally, the method includes sending the event notification including the event information from the first computer system to the second computer system.

The details of one or more implementations are set forth in the accompanying drawings and the description below. Other features will be apparent from the description, the drawings, and the claims.

DESCRIPTION OF DRAWINGS

FIG. 5 is a diagram of an example computer system.

Like reference symbols in the various drawings indicate like elements.

DETAILED DESCRIPTION

Large-scale operations or businesses often use applications to help track the voluminous amount of activity occurring across a computer system. This activity can be monitored to identify occurrences of certain events which should be brought to the attention of other computer systems. For example, businesses cooperating in joint business-ventures may share computer data relevant to the joint venture with other computer systems. As such, it can be important that the computer data generated by the computer system of one business is compatible with software of the computer system of another business. Occurrences of installation of new software applications or alteration of an existing application can be deemed a relevant event and can trigger an event notification to be sent from one computer system to another computer system.

In one general example, a manufacturing business ("manufacturer") creates items (i.e., products) in a factory which are later picked up and sold by a retail business ("retailer"). The manufacturer shares computer data generated by item management software with the retailer to enable the retailer to track the readiness of items for shipment. The computer data generated by the item management software is proprietary, and therefore, is not generally compatible with other software. If the manufacturer adopts a new application to more accurately track item readiness for shipment, the retailer may stand to benefit from also adopting new software. The new software can be the application adopted by the manufacturer or can be other software. For example, the item management software installed by the manufacturer may be a customized enterprise application designed specifically to manage the manufacturer's systems. In response, the retailer may benefit from adopting new or updated software, such as a customized enterprise application which is designed to manage the retailer's systems and is designed to be compatible with data produced by the manufacturer's customized enterprise application.

Applications can be used to monitor the manufacturing business for important events and to report or otherwise react to the occurrence of such events. For example, applications can be used to monitor for events, such as, the completion of construction of an item at a factory, the readying of an item for shipment, and the departure or arrival of items being shipped. In addition, a landscape utility application monitors for the occurrence of software changes at the manufacturer's computer system. Notification of software changes can efficiently facilitate the cross-business adoption of relevant software changes. More specifically, as the new application is adopted, the landscape utility application detects the change and sends a notification to the retailer's computer system. The notification can include relevant information to enable the retailer to efficiently adopt the same or an otherwise compatible application.

Figure 1:
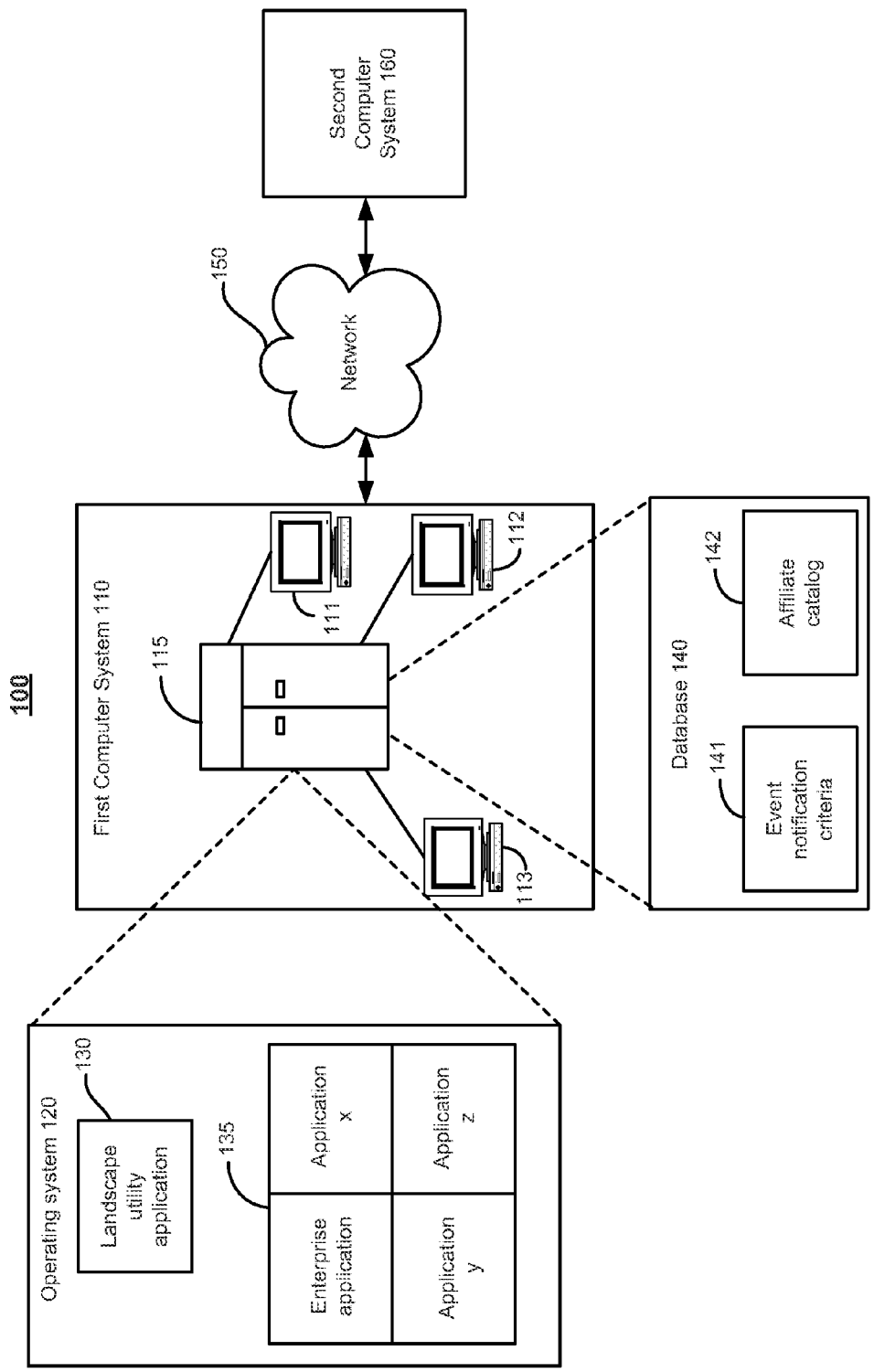
FIG. 1 is a diagram of an example of systems configured to use event notifications of program landscape alterations.

FIG. 1 is a diagram 100 of an example of systems configured to use event notifications of program landscape alterations. In the diagram 100, a first computer system 110 of a first business uses a landscape utility application 130 to provide event notifications of alterations to one or more other participants in the program landscape. The event notifications are sent to a second computer system 160 of a second business which benefits from the information of alterations to the program landscape of the first computer system 110.

The first computer system 110 includes individual terminals 111-113, a centralized server 115, and a database 140. Additional details of hardware and function of a computer system are described below with respect to FIG. 5. The first computer system 110 is exemplary, and, as shown, can represent any number of networked computer systems at various locations of a business.

An operating system 120 of the first computer system 110 operates on the centralized server 115 or one of the individual terminals 111-113. The operating system 120 serves as a platform for the first computer system 110 to manage various applications. As shown, the operating system 120 manages the landscape utility application 130 and various other applications 135. In other implementation, the landscape utility application 130 functions as the operating system 120.

A database 140 can be implemented in a computer-readable medium located within the centralized server 115, in a computer-readable medium located within one of the individual terminals 111-113, or in a separate storage device network-connected to the centralized server 115 or the individual terminals 111-113. The database 140 stores data corresponding to event notification criteria 141 and an affiliate catalog 142. The event notification criteria 141 can indicate the types of events and/or the contextual criteria which are desired to generate an event notification. For example, the event notification criteria can include an indication that event generation criteria should be generated for software installation but not for new configuration of existing software. The affiliate catalog 142 includes a list of other computer systems that interact or are otherwise associated with the first computer system 110. When an event notification is generated, the affiliate catalog 142 provides information necessary to identify recipients of the event notification.

The landscape utility application 130 runs on the first computer system 110 and monitors activity in the first computer system 110 for indications that the program landscape of the first computer system 110 is altered. Monitoring activity in the first computer system 110 can include monitoring for addition or removal of applications maintained in the database 140 or running in on the operating system 120. Also, monitoring activity can include monitoring for alteration to applications registered at a program registration of the operating system 120 (e.g., the registry of Microsoft XP™), alterations of a version of an existing application, or alterations to a configuration of an existing application. In addition, monitoring for alterations of a program landscape can include monitoring for other occurrences pertaining to software capabilities of a computer system. Upon detecting that an alteration of the program landscape has occurred, the landscape utility application 130 accesses the affiliate catalog 142 and the event generation criteria to determine whether an event notification should be generated, what information should be included, and which other computer systems should be sent the event notification.

The landscape utility application 130 can determine that an event notification should be sent to a second computer system 160 through a network 150. The determination can be a completely automated process or can involve operator interaction. For example, in some implementations, the landscape utility application 130 can be configured to send event notification only after an operator approved the event notification and/or the identity of the recipient(s) (e.g., the second computer system 160). The second computer system 160 may be a business partner, supplier, or customer of a business operating the first computer system 110, or may be otherwise affiliated with the first computer system 110. As such, the second computer system 160 may stand to benefit from adopting new software or software changes occurring at the first computer system 110, either for convenience or necessity of operation. The network 150 can be the Internet or other types of communication networks. The event notification can be configured in a format usable by other instances of the landscape utility application 130 running at the second computer system 160, or can be sent in a generic format, such as the format of a text file, usable by common operating systems.

Figure 2:
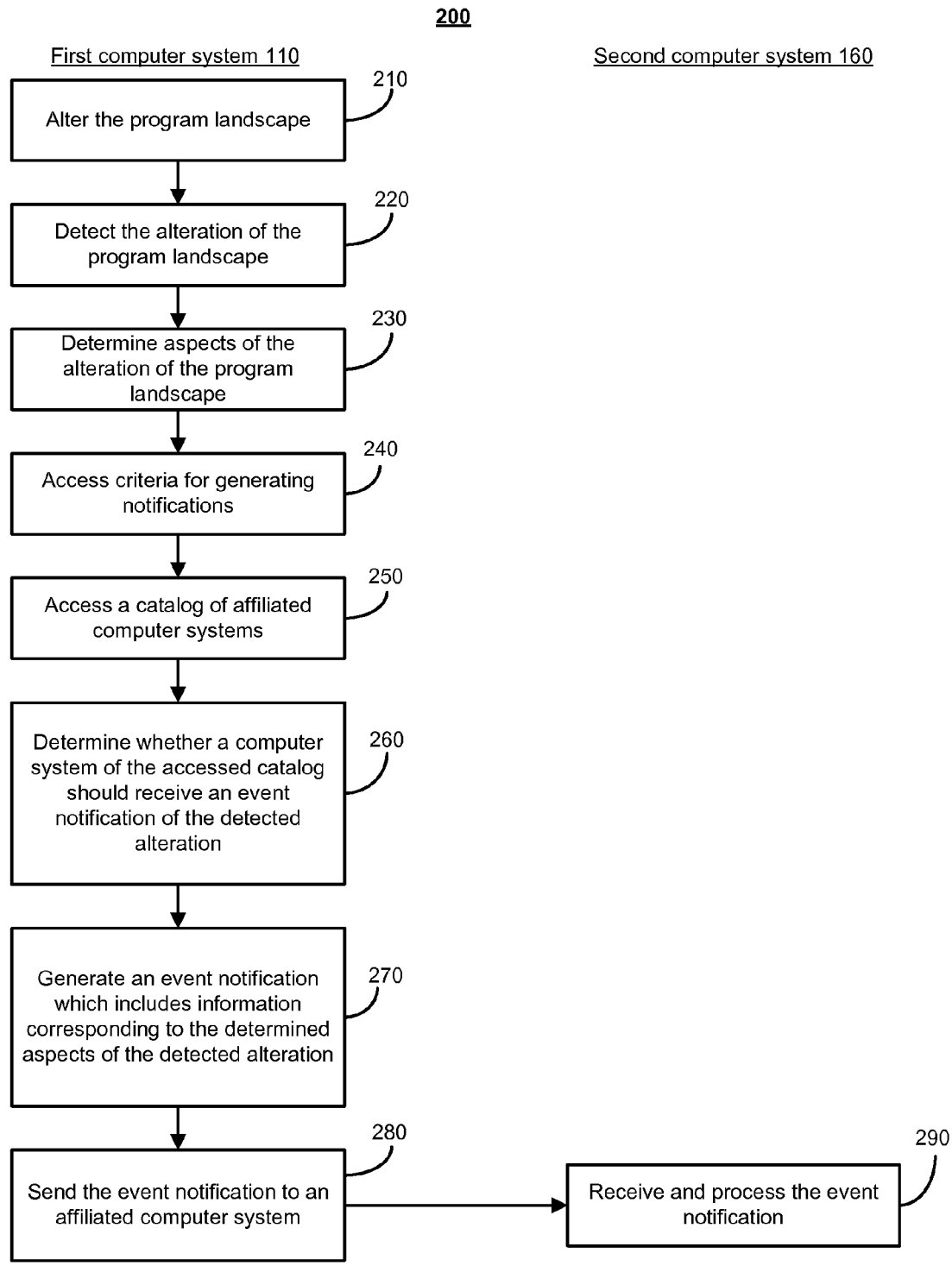
FIG. 2 is a flow chart of an example of a process for sending an event notification of a program landscape alteration.

FIG. 2 is a flow chart of an example of a process 200 for sending an event notification of a program landscape alteration. In the process 200, installation of a new program causes a notification to be sent to a remote computer system. The process 200 can be carried out with the first computer system 110 of FIG. 1 or with one or more other systems. For ease of understanding, the description below references the manufacturer and the retailer example discussed above in conjunction with the first computer system 110 and second computer system 160 of FIG. 1. Implementations of the process 200, however, can be carried out with other systems and/or in other contexts.

The process begins with the occurrence of an alteration to the program landscape (in step 210). The alteration can occur at the individual terminal 111 or at the centralized server 115. For example, a user at the manufacture may operate a terminal to install a new proprietary tracking application to better track the status of items created at a factory. The application is registered as a new application in addition to the existing various applications 135 managed by the operating system 120.

Next, the first computer system 110 detects the alteration of the program landscape (in step 220). The landscape utility application 130 may detect the alteration by monitoring, for example, an application registry or active processes of the operating system 120. In particular, the proprietary tracking application registers itself with the operating system 120, thereby triggering detection of the installation by the landscape utility application 130.

The first computer system 110 determines aspects of the alteration of the program landscape (in step 230). The aspects can include the nature of the alteration, such as, for example, a program installation or deletion, a version change of a program, or a change to the configuration of a program. The aspects can also include information concerning the context of the change, such as, for example, the time of the alteration, hardware involved in the change, the physical location of hardware involved in the change, an individual authorizing the change, or types of business related to the change. For example, the landscape utility application 130 may determine that the new program was installed at warehouse A by the general manager and is related to item tracking.

The first computer system 110 accesses criteria for generating notifications (in step 240). The criteria indicates which types of alterations should result in generation of an event notification. The criteria can be stored on the database 140 based on user configuration or may be preset instructions built into the landscape utility application 130. In the manufacture example, the landscape utility application 130 accesses the event notification criteria 141 in response to the detection of the alteration. The event notification criteria 141 indicates that notification events should be generated in response to the installation of new programs which pertain to item tracking and should be sent to affiliated computer systems.

Also, the first computer system 110 accesses a catalog of affiliated computer systems (in step 250). The catalog indicates other associated computer systems which may receive event notifications. The catalog may list customers or business partners and may identify the context of a relationship. Also, the catalog can indicate specific characteristics of the other associated computer systems useful in determining whether an alteration of the program landscape is relevant to the other associated computer systems. Characteristics can include the type or configuration of software used by the other associated computer systems. Similarly, the landscape utility application 130 of the manufacturer can access the affiliate catalog 142 after accessing the event notification criteria 141. The affiliate catalog 142 can indicate that the operator of second computer system 160 is a retailer receiving items made at a factory operated by the first computer system 110 and managing tracking of items using a software application no longer used by the first computer system 110.

Next, the first computer system 110 determines whether a computer system of the accessed catalog should receive an event notification of the detected alteration (in step 260). The accessed criteria for generating notifications and catalog of affiliated computer systems can be used to make the determination. For example, the landscape utility application 130 may access the notification criteria (in step 240) to determine the circumstances under which an affiliated computer system should receive an event notification and may access the catalog of affiliated computer systems (in step 250) to determine whether any affiliated computer systems meet the criteria. In some implementations, the determination includes operator input. In particular, the landscape utility application 130 provides an indication on a graphical user interface to an operator that an event notification can be sent. The operator can provide input to approve, deny, or alter the event notification. For example, the operator can add or subtract recipients of the event notification and can modify the information included in the event notification. In the manufacturer example, the landscape utility application 130 determines that an event notification should be generated and sent to the second computer system 160 because the second computer system 160 is an affiliated retailer of tracked items and the alteration is an installation of new program pertaining to item tracking.

Thereafter, the first computer system 110 generates an event notification which includes information corresponding to the determined aspect(s) of the detected alteration (in step 270). The information corresponding to the determined aspects can include a summary of the type of alteration or other contextual information. In some implementations, the landscape utility application 130 collects information from a third party to include in the event notification. For example, the landscape utility application 130 can be configured to collect information over the Internet to include in the event notification. Also, the event notification can be in a data format unique to the landscape utility application 130 or may be a standardized format usable by other applications or by the operating system 120, such as the format of a text document. The first computer system 110 of the manufacturer example creates an event notification indicating that the first computer system 110 has installed a new proprietary tracking application for items at the factory. The created event notification is in a format unique to the landscape utility application 130.

The first computer system 110 sends the event notification to an affiliated computer system (in step 280). The event notification can be sent through various network communication mediums, such as network 150, and can be configured for automated receipt by an application or for receipt by a human operator. The event notification can be sent to an open port of an application of a predetermined recipient application, such as, an instance of the landscape utility application 130 running at the second computer system 160. Also, the event notification can be sent as an e-mail, instant message, fax, or other communication for handling by a computer program or human operator. Turning again to the manufacturer, the landscape utility application 130 sends the event notification over the Internet to an instance of the landscape utility application 130 running on the second computer system 160.

In some implementations, the landscape utility application can be an enterprise solution running on both the first and second computer systems 110 and 160. The enterprise solution of the first computer system 110 can be configured to communicate with the enterprise solution of the second computer system 160 to notify the second computer system 160 of the addition of a new application which is within the enterprise solution or compatible with the enterprise solution. This may be particularly useful, for example, where a new application installed in an enterprise solution running at the first computer system 110 produces data handled by the enterprise solution running at the second computer system 160.

Finally, the affiliated computer system receives and processes the event notification (in step 290). In some implementations, processing the event notification can include rendering information of the event notification on a graphical user interface of a terminal of the second computer system 160. In other implementations, processing the event notification includes additional functioning, such as retrieving information according to instruction in the event notification (e.g., a website of a uniform resource locator) or providing an option to make an alteration of the program landscape of the second computer system 160 similar to the alteration of the program landscape of the first computer system 110. Turning once again to the manufacturer example, an instance of the landscape utility application 130 at the second computer system 160 of the retailer receives the event notification and extracts the information about the new proprietary tracking application installed by the first computer system 110. Thereafter, the second computer system 160 renders information to a human operator of the second computer system 160 and a hyperlink to a website where the proprietary item tracking application can be obtained.

Figure 3:
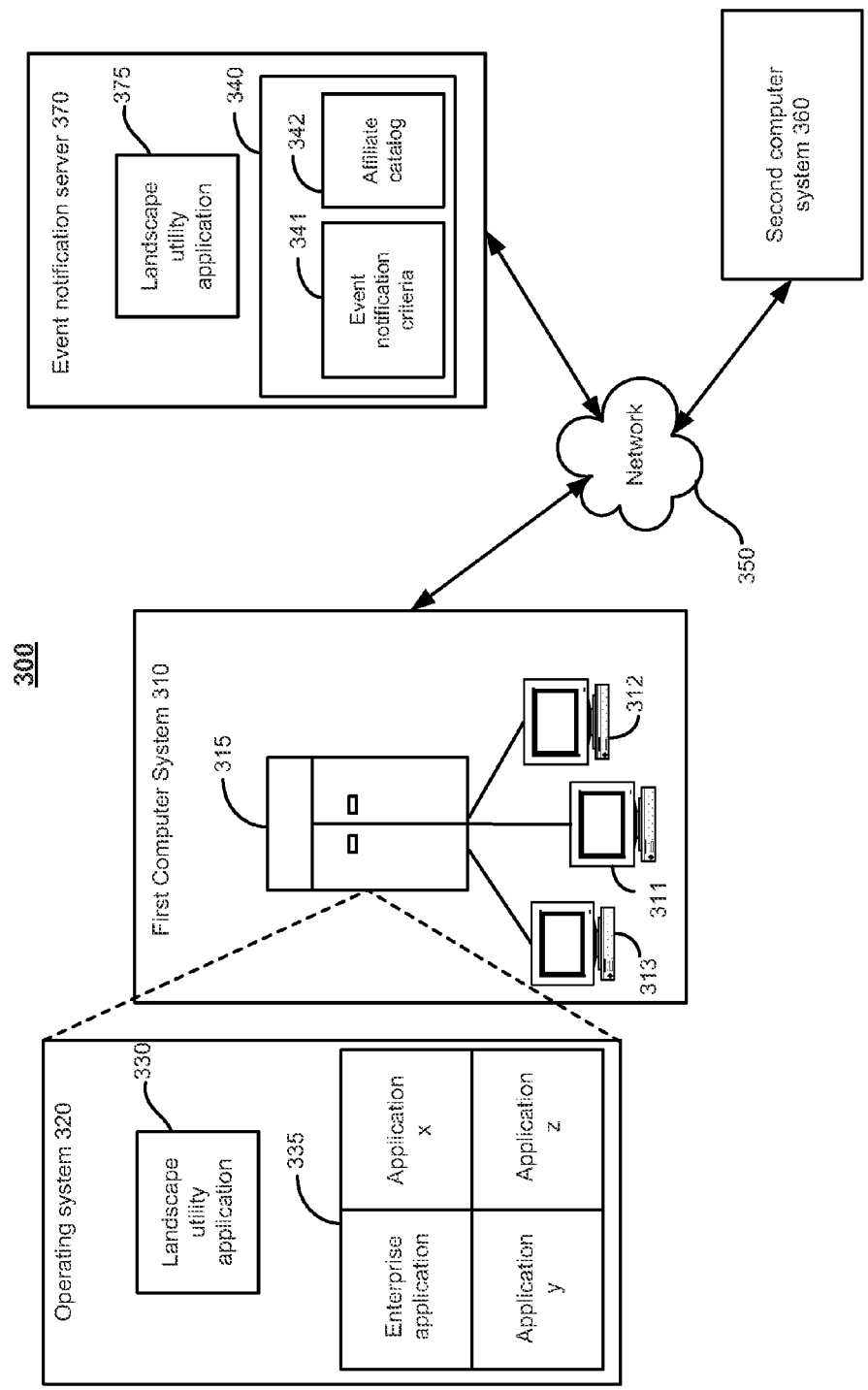
FIG. 3 is a diagram of an example of systems configured to use event notifications of program landscape alterations with an event notification server.
Figure 4:
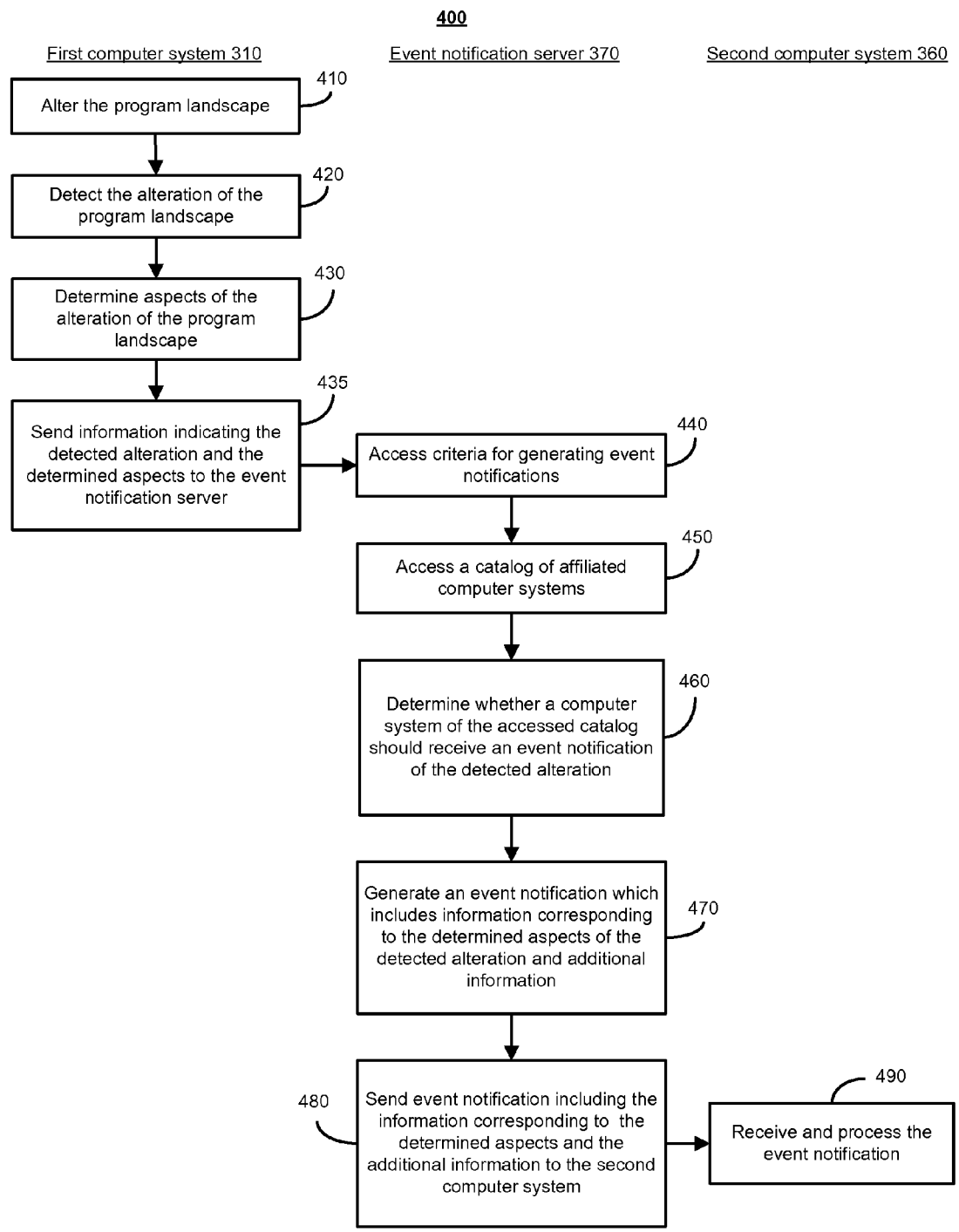
FIG. 4 is a flow chart of an example of a process for sending an event notification of a program landscape alteration with an event notification server.

FIGS. 3 and 4 relate to additional implementations of techniques described with respect to FIGS. 1 and 2, and include additional features pertaining to the use of an event notification server 370 in generating the event notifications. Use of the event notification server 370 can enable generation of more robust event notification. For example, if the event notification server 370 is a provider of an application involved in the alteration of the program landscape, the event notification server 370 can directly provide further information about the application or the ability to obtain the application.

In particular, FIG. 3 is a diagram 300 of an example of systems configured to use event notifications of program landscape alterations with an event notification server 370. In the diagram 300, a first computer system 310 with a centralized server 315 and individual terminals 311-313 maintains an operating system 320. The operating system 320 can serve as a platform to run a landscape utility application 330 and various other applications 335. The first computer system 310 and a second computer system 360 both communicate to the event notification server 370 via a network connection 350, such as the Internet. The event notification server 370 maintains a landscape utility application 375 and includes a database 340. The database 340 stores data corresponding to event notification criteria 341 and an affiliate catalog 342.

FIG. 4 is a flow chart of an example of a process 400 for sending an event notification of a program landscape alteration with an event notification server 370. In particular, the instance of the landscape utility application 330 running on the first computer system 310 is directed to detecting the alteration of the program landscape (in step 420) and determining aspects of the alteration of the program landscape (in step 430) in response to the occurrence of an alteration to the program landscape of the first computer system 310 (in step 410). Thereafter, the landscape utility application 330 running on the first computer system 310 sends information indicating the detected alteration and the determined aspects to the event notification server 370 (in step 435).

Similar to the techniques discussed above, the landscape utility application 375 accesses criteria for generating notifications (in step 440), such as, for example, the notification criteria 341. Also, the landscape utility application 375 accesses a catalog of affiliated computer systems (in step 450), such as, for example, the affiliate catalog 342. Thereafter, the landscape utility application 375 determines whether a computer system of the accessed catalog should receive an event notification of the detected alteration of the program landscape of the first computer system 310 (in step 460).

Next, the landscape utility application 375 generates an event notification which includes information corresponding to the determined aspects of the alteration of the program landscape and additional information provided by the landscape utility application 375 (in step 470). The additional information can include, for example, the availability of a program corresponding to the program landscape alteration or compatibility information indicating the need for an affiliated computer system to also install the program. The landscape utility application 375 sends the event notification including the information corresponding to the determined aspects and the additional information to the second computer system 460 (in step 480). Finally, the second computer system 460 receives and processes the event notification (in step 490).

For reference with respect to the computer systems shown in and/or used by FIGS. 1-4 discussed above, FIG. 5 is a schematic diagram of a computer system 500. The computer system 500 can be used for the operations described in association with any of the computer-implement methods described previously, according to one implementation. The computer system 500 includes a processor 510, a memory 520, a storage device 530, and an input/output device 540. Each of the components 510, 520, 530, and 540 are interconnected using a system bus 550. The processor 510 is capable of processing instructions for execution within the computer system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the computer system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the computer system 500. In one implementation, the storage device 530 is a computer-readable medium. In various different implementations, the storage device 530 may be a floppy disk device, a hard disk device, an optical disk device, or a tape device.

The input/output device 540 provides input/output operations for the computer system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method comprising:
  initiating a first enterprise solution instance in a first computer system, wherein a second enterprise solution instance is installed in a second computer system;
  monitoring, by the first enterprise solution instance, the first computer system for a change regarding an application within the first enterprise solution instance, the change comprising alteration or installation of the application;

detecting, by the first enterprise solution instance, the change regarding the application;

determining, by the first enterprise solution instance, aspects of the change;

generating, by the first enterprise solution instance, an event notification including information corresponding to the determined aspects of the change; and sending the event notification including event information from the first enterprise solution instance to the second enterprise solution instance, wherein the second enterprise solution instance offers a user of the second computer system to make the detected change also with regard to the second computer system.

2. The method of claim 1 wherein monitoring the first computer system includes monitoring a registry of an operating system for the addition of a new entry.

3. The method of claim 1 wherein determining aspects of the change includes determining a name of the application.

4. The method of claim 3 wherein:

generating the event notification including information corresponding to the determined aspects of the change includes generating the event notification as including the determined name of the application; and sending the event notification including the event information from the first computer system to the second computer system includes sending the event notification including the determined name of the application.

5. The method of claim 1 wherein determining aspects of the change includes determining a time of the change.

6. The method of claim 5 wherein:

generating the event notification including information corresponding to the determined aspects of the change includes generating the event notification as including the determined time of the change; and sending the event notification including the event information from the first computer system to the second computer system includes sending the event notification including the determined time of the change.

7. The method of claim 1 wherein determining aspects of the change includes determining a type of activity related to the change.

8. The method of claim 7 wherein:

generating the event notification including information corresponding to the determined aspects of the change includes generating the event notification as including the type of activity related to the change; and sending the event notification including the event information from the first computer system to the second computer system includes sending the event notification including the type of activity related to the change.

9. The method of claim 1 wherein determining aspects of the change includes determining a physical location related to the change.

10. The method of claim 9 wherein:

generating the event notification including information corresponding to the determined aspects of the change includes generating the event notification as including the physical location related to the change; and sending the event notification including the event information from the first computer system to the second computer system includes sending the event notification including the physical location related to the change.

11. The method of claim 1 wherein determining aspects of the change includes determining an identity of an operator involved in the change.

12. The method of claim 11 wherein:

generating the event notification including information corresponding to the determined aspects of the change includes generating the event notification as including the identity of the operator involved in the change; and sending the event notification including the event information from the first computer system to the second computer system includes sending the event notification including the identity of the operator involved in the change.

13. The method of claim 1 further comprising:

accessing a catalog of additional computer systems that have instances corresponding to the first enterprise solution instance;

determining that the second computer system of the accessed catalog of additional computer systems should receive the event notification; and accessing notification criteria, wherein determining the second computer system of the accessed catalog of additional computer systems should receive the event notification includes determining that the second computer system of the accessed catalog of additional computer systems meets criteria of the accessed notification criteria.

14. The method of claim 13 wherein determining that the second computer system of the accessed catalog of additional computer systems meets criteria of the accessed notification criteria includes determining that the change relates to type of business or activity of which the second computer system is also related.

15. The method of claim 1 wherein the computer-implemented method is performed entirely at the first computer system.

16. The method of claim 1 further comprising sending information corresponding to the determined aspects of the change from the first computer system to a server.

17. The method of claim 16 further comprising:

accessing a catalog of additional computer systems that have instances corresponding to the first enterprise solution instance; and determining that the second computer system of the accessed catalog of additional computer systems should receive the event notification;

wherein:

the server performs the accessing of the catalog of additional computer systems which are associated with the first computer system;

the server performs the determining that the second computer system of the accessed catalog of additional computer systems should receive an event notification;

the server performs the generating of the event notification including information corresponding to the determined aspects of the change; and the server performs the sending of the event notification including the event information from the first computer system to the second computer system.

18. The method of claim 17 further comprising, determining, at the server, additional information to be included in the event notification, wherein:

generating the event notification includes generating the event notification as including:

information corresponding to the determined aspects of the change received from the first computer system, and the additional information determined at the server; and sending the event notification to the second computer system includes sending the event notification including information corresponding to the determined aspects of the change and the additional information to the second computer system.

19. A computer program product tangibly embodied in a computer-readable storage medium and comprising instructions that when executed by a processor perform a method comprising:

initiating a first enterprise solution instance in a first computer system, wherein a second enterprise solution instance is installed in a second computer system;

monitoring, by the first enterprise solution instance, the first computer system for a change regarding an application within the first enterprise solution instance, the change comprising alteration or installation of the application;

detecting, by the first enterprise solution instance, the change regarding the application;

determining, by the first enterprise solution instance, aspects of the change;

generating, by the first enterprise solution instance, an event notification including information corresponding to the determined aspects of the change; and sending the event notification including event information from the first enterprise solution instance to the second enterprise solution instance, wherein the second enterprise solution instance offers a user of the second computer system to make the detected change also with regard to the second computer system.

\* \* \* \* \*